US008248207B2

(12) United States Patent
Hamling et al.

(10) Patent No.: US 8,248,207 B2
(45) Date of Patent: Aug. 21, 2012

(54) METHOD FOR USING A TABLE OF DATA TO CONTROL ACCESS TO A SECURE CONTAINER

(75) Inventors: Christopher Murray Anthony Hamling, Auckland (NL); John William Nelson Hodgson, Auckland (NL); Thomas James Routt, Edmonds, WA (US)

(73) Assignee: Safetystream Mobile Limited, Auckland (NZ)

( * ) Notice: Subject to any disclaimer, the term of this patent is extended or adjusted under 35 U.S.C. 154(b) by 0 days.

(21) Appl. No.: 13/038,889

(22) Filed: Mar. 2, 2011

(65) Prior Publication Data

US 2011/0241883 A1 Oct. 6, 2011

Related U.S. Application Data

(62) Division of application No. 11/430,448, filed on May 9, 2006, now Pat. No. 7,920,048.

(60) Provisional application No. 60/679,140, filed on May 9, 2005, provisional application No. 60/686,353, filed on Jun. 1, 2005, provisional application No. 60/686,817, filed on Jun. 2, 2005, provisional application No. 60/705,390, filed on Aug. 4, 2005, provisional application No. 60/717,553, filed on Sep. 15, 2005.

(51) Int. Cl.
*G08B 13/14* (2006.01)
*G06F 7/04* (2006.01)

(52) U.S. Cl. .................................... 340/5.73; 340/545.6

(58) Field of Classification Search ................. 340/5.26, 340/568.1, 5.61, 5.73, 545.6
See application file for complete search history.

(56) References Cited

U.S. PATENT DOCUMENTS

| | | | | |
|---|---|---|---|---|
| 4,673,914 | A | 6/1987 | Lee et al. | |
| 5,093,861 | A * | 3/1992 | Graham | 713/185 |
| 5,600,324 | A * | 2/1997 | Reed et al. | 341/176 |
| 6,265,973 | B1 | 7/2001 | Brammall et al. | |
| 7,455,302 | B2 | 11/2008 | Young et al. | |
| 2002/0170473 | A1 | 11/2002 | Fettis et al. | |
| 2003/0098774 | A1 | 5/2003 | Chornenky | |
| 2004/0088497 | A1 | 5/2004 | Deans et al. | |

OTHER PUBLICATIONS

International Search Report dated Feb. 16, 2007 in PCT/US06/17847.

Written Opinion of the International Searching Authority dated Feb. 16, 2007 in PCT/US06/17847.

* cited by examiner

*Primary Examiner* — Brian Zimmerman
*Assistant Examiner* — Omer S Khan
(74) *Attorney, Agent, or Firm* — Edwards Wildman Palmer LLP; George N. Chaclas

(57) ABSTRACT

A container has a lid and a locking mechanism. The locking mechanism includes a male wall with a switch. A female wall mounts to the inside wall of the container and, when closed, encompasses the male wall. The female wall has a magnet that activates the switch. A lever contained inside the male wall moves into and out of a slot formed in the female wall. The switch completes a circuit that generates a close signal to the lever when the lid is closed. A button extends through a hole in the lid such that the button can be depressed to indicate locking and cannot be depressed when unlocked. When unlocked, the button cannot be depressed because the lever blocks the button. To open the container when closed, the actuation mechanism moves the lever in response to an entered code that must match a stored code or calculated content-specific code.

17 Claims, 6 Drawing Sheets

METHOD FOR USING A TABLE OF DATA TO CONTROL ACCESS TO A SECURE CONTAINER

CROSS-REFERENCE TO RELATED APPLICATION

This application claims priority to U.S. Provisional Patent Application No. 60/679,140 filed on May 9, 2005, U.S. Provisional Patent Application No. 60/686,353 filed on Jun. 1, 2005, U.S. Provisional Patent Application No. 60/686,817 filed on Jun. 2, 2005, 60/705,390 filed on Aug. 4, 2005, and U.S. Provisional Patent Application No. 60/717,553 filed on Sep. 15, 2005, and is a divisional of U.S. Utility patent application Ser. No. 11/430,448 filed on May 9, 2006 now U.S. Pat. No. 7,920,048 issued on Apr. 5, 2011, each of which is incorporated herein by reference.

BACKGROUND OF THE INVENTION

1. Field of the Invention

The subject disclosure generally relates to security systems and methods, and more particularly, to an electronic device ("electronic" or "electronic device" as used herein refers to any possible combination of electronic, optical, or opto-electronic device) that provides a simple yet secure means of controlling access to a unit of value which may include objects, spaces such as rooms buildings or secure areas, information or other items. The subject disclosure is also directed to a stationary or mobile container having a body and cavity defined therein for holding and storing items wherein the container includes a locking mechanism that utilizes the aforementioned systems and methods.

2. Background of the Related Art

Despite the advancements of the modern information age, people still prize certain objects such as keepsakes, diamonds and other precious items. Often one desires to ship such valuable items and enlist the services of a courier or the postal service. Such couriers often employ simple sealed cardboard boxes with tamper indication means or simple lockable boxes with little in the way of tamper indication means. As a result, the unscrupulous, when given an opportunity, may simply improperly take possession of the contents of the package. Even with detailed tracking, it can be difficult to identify the culprit and even if found, the likelihood of recovery is small. Thus, courier transport of valuable goods in packages including boxes often results in loss of some or all of the valuable goods. The pilferage may be by someone who may have a business relationship with the sender of the valuable goods and who opens the box or accesses the contents of the package that holds the valuable goods and takes possession improperly. That person may be an employee of the sender or may be an employee of the recipient or may be an employee of the courier company itself.

It can be difficult and time consuming to detect where these losses occur in the shipment of valuable goods as employees of the owner or sender, employees of the recipient and also employees of the courier may all have the opportunity to pilfer without detection. If the pilferage losses are small for any shipment, the owner of the valuable goods may find it expedient to insure for pilferage losses of a certain amount as the time spent tracking down where the loss occurs even if it can be determined may be worth more than the insurance premium. The does mean that insurance premiums for carriage of valuable goods by courier transport are higher than they could otherwise be. As pilferage is the most common cause of losses in courier transport, it is worthwhile to develop products and systems that prevent it; for owners of valuable goods, for courier operators and for their respective insurers.

Many attempts have been made to provide improved systems. For example, Patent Cooperation Patent Application Serial No. PCT/NZ99/00176 filed on Oct. 15, 1999 and published by the World Intellectual Property Organization as WO 00/23960 on Apr. 27, 2000, which is incorporated by reference herein in its entirety, disclosed a remote access security system. For another example, see U.S. Pat. No. 6,917,279 B1 (the '279 patent) issued Jul. 12, 2005, which is hereby incorporated herein by reference. The '279 patent discloses a system designed to provide secure means to transfer access information to and from units of value that were remote to the place where the information was controlled. However this system did not provide the means to protect items of value in a container from pilferage and required direct communication between the units of value called the Remote Value Node and the Central Management Node, which was the remote control computer where the information pertaining to access could be retrieved. That communication to and from the unit of value to the control computer was via the Personal Access Node. This communication may not be possible in many circumstances and may be too awkward or expensive in other circumstances. Therefore these shortcomings, among other things, promoted the further developments included herein.

SUMMARY OF THE INVENTION

In view of the above shortcomings and others well known to those of ordinary skill in the pertinent art, the subject technology looks to provide a secure package, which is difficult to open without permission, yet relatively easy to transport.

Further, the subject technology also provides means to create detailed records related to who, when and/or where the package was opened.

It is one object of the present invention to protect the owner of the valuable goods that are being shipped from pilferage and also protect the courier who carries the valuable goods from pilferage by their own employees. That protection can be provided by having the container in which the valuable goods are shipped locking on closure of the container and only being able to be opened with the use of a specific code that is obtained when the box is to be opened on delivery.

If the container is tamper and pilfer proof; any attempt to illegally open the container will show on the container itself then a major source of loss to owners of valuable goods and shippers of valuable goods can be prevented.

In one embodiment, the subject technology is directed to an electronic device that provides a simple yet secure means of controlling access to a unit of value which may include objects, spaces, information or other items stored or held in a container for a period of time. The electronic device is preferably used to control access to the unit of value in the container or other holding devices, and each unit of value may have an electronic device.

When access is required to the unit of value, an authorized person or entity may obtain or receive a code from a computer in a proximate or remote location that can access the control computer. This code is used in the electronic device to gain access to the unit of value.

The electronic device may be programmed to allow this code to gain access to the unit of value once only, or may be programmed to allow this code to gain access to the unit of value a predefined (1 to n) number of times, or may be programmed to allow this code to gain access to the unit of value until another code is input or another predefined event occurs. In one embodiment, a predefined event is selected from the group consisting of the unit of value is no longer in the same location as determined by feedback from adjacent RFID readers, or the unit of value no longer has the same contents as determined by the RFID reader associated with the electronic device reading all the RFID tags on items contained with the unit of value.

In one embodiment, each electronic device preferably has its own table of randomly generated or pseudo-randomly generated digits that create a series of codes. One to n computers at one to n remote locations have access to an identical table of randomly generated or pseudo-randomly generated digits that create a series of codes in one to n control computers. The table of randomly generated digits or pseudo-randomly generated digits is preferably generated by one to n computers and loaded into one to n electronic devices and also one to n control computers at one to n remote locations. Each electronic device has a unique identifier. This unique identifier is also registered in the control computer. The control computer can be used to hold the tables of randomly generated digits of one to n electronic devices.

The table of randomly generated digits or pseudo-randomly generated digits (hereafter the table of randomly generated digits) is preferably accessed in a pre-defined sequence calculated using a suitable algorithm to match the requirements of a particular access control system. A pointer points to a place in the table of randomly generated digits from which it is to obtain the first digit in the next sequence of digits that form the code. This pointer is called the index.

The code may be formed by the digit pointed to by the index and a certain number of digits in the table using another suitable algorithm. For instance, the digits may be a certain number of digits immediately following the index digit or may be a certain number of digits further along the table.

For instance, the codes so created may be 8-digit codes and these codes may be sequential with the index for the first code at position 0 in the table, the index for the second code at position 8 in the table, the index for the third code at position 16 in the table and so on.

One preferred means of using this system may be to have the electronic device recognize as valid any one of a plurality of sequential codes after the index, for example, the five sequential codes after the index. For example, if the index is at position 0 in the table, the five sequential codes that would be recognized are index at position 0, index at position 8, index at position 16, index at position 24, index at position 32. When any one of those five codes is used in the electronic device to gain access to the unit of value, the index moves to the next position in the table that corresponds to the next 8-digit code after that code just used. The electronic device would then again recognize as valid any of the five sequential codes after the index. By this means, the probability that the electronic device and the control computer can get out of synchrony can be greatly reduced. Desynchronization occurs when the control computer issues a code and that code is not used in the electronic device. The control computer index moves along the table of codes but the electronic device index has not moved along the table of codes as the electronic device has not been used.

Having the electronic device recognize as valid any one, for example, of the next five sequential codes following the index means that the control computer would have had to issue five codes none of which has been used in the electronic device before the control computer and the electronic device are out of synchrony. This is unlikely to occur in normal use. Control computer issuance of five successive codes prior to code use, if it does occur, may be an expression of a deliberate attack on the code management system. In the above example, five sequential codes is given by way of example and the number of sequential codes recognized as valid after the index for any particular unit of value could be more or less than five.

When the index or the digits that follow the index that form the code are at or would extend past the end of the table of digits, the table of randomly generated digits may be used again using the same index initializing from the same start point or a new start point or re-indexed and used again. For example, if the codes so created are 8-digit codes and these codes are sequential with the index for the first table code at position 0 in the table, the index for the second code at position 8 in the table, the index for the third code at position 16 in the table and so on; when the index or the 7 digits that follow the index that form the code are at or would extend past the end of the table of digits, the pointer may go to index 143 in the table for instance (which is not a multiple of 8) and a new series of 8-digit codes would be created that would be different from the first series.

If the index in the control computer and the index in the electronic device do get out of synchrony with one another, a means preferably exists whereby the index in the electronic device can be set to a value specified by the control computer. This will bring the index in the control computer and the index in the electronic device back into synchrony. For instance, in one embodiment, when resynchronization is required, a resynchronization code is obtained from the control computer that when input into the electronic device instructs the electronic device that the index is to move to the position in the table described by the pointer number that is input immediately following the resynchronization code.

In another mode of use, every time access is required to the unit of value the resynchronization code is input into the electronic device and the index moves to the position in the table described by the pointer number input immediately following the resynchronization code. The code is then read from that index.

In another mode of use, every time access is required to the unit of value the resynchronization code is input into the electronic device but the index will not move to the position in the table described by the pointer number input immediately following the resynchronization code unless some predefined event occurs or has occurred that sends a signal to the electronic device to allow the index to move from the position it was in at the time the previous code was read. This predefined event that sends an electronic signal to the electronic device may occur either before the resynchronization code is input or after. The code is then read from that index.

In one embodiment, the event may be a signal from one or more Radio Frequency Identification (RFID) readers at specific location or locations into a RFID card or RFID tag embedded or fastened to the unit of value that sends a signal to the electronic device to move the index to the next location in the table according to the suitable algorithm as mentioned above.

In this manner, the unit of value that has the electronic device configured to allow a code to gain access once only cannot be accessed by a code obtained or received from a computer in a remote location that can access the control computer until it is in range of one or more RFID reader at specific location or locations. This means that the unit of value has to be at a particular location before the electronic device will allow access and that the process of moving the index to the next location in the table is automatic once the unit of value is at that place. In other words, the electronic device of a unit of value is essentially switched off until the unit of value is at one or more locations.

In another embodiment, 1 to n RFID reader at 1 to n specific locations, once the reader(s) recognize the RFID tag associated with the unit of value, may send a signal to the control computer via suitable local area and/or wide area communications means, which permits the control computer to be accessed by the remote computers to allow a code to be obtained or received by 1 to n individuals and/or 1 to n entities requiring access to 1 to n units of value.

Until that signal is received from one or more RFID readers at one or more specific locations, the control computer cannot be accessed by remote computers to provide codes. Thus, access to the control computer to obtain a code for a unit of value is essentially switched off until that unit of value is at one or more locations.

In another embodiment of the present invention, the RFID reader at a specific location, once it has recognized the RFID tag associated with the unit of value, may send a signal to the control computer via suitable local area and/or wide area communications means, which instructs the control computer to send by suitable local area and/or wide area communications means a signal to a code receiving device on the unit of value that instructs the electronic device to move the index to the next location in the table. The unit of value is essentially inaccessible until the unit of value is at one or more locations.

In another illustrative embodiment, the unit of value is a box having a RFID reader adjacent to the electronic device in the box. The code receiving device which communicates with the electronic device, which for purposes of illustration of the features of this embodiment of the present invention, is a keypad mounted on the lid of the box.

To program the RFID reader in the box, an authorized person, who may be the owner of the box, must enter a valid code in the keypad, which must first be retrieved from a code delivery device, preferably a control computer in a remote location. The valid code instructs the RFID reader in the box that the next RFID tag read is the valid RFID tag to open the box.

The person who is authorized to open the box uses a RFID tag to open the box by holding the RFID tag close to the keypad. The person may first be required to press a START key to energize or wake up the RFID reader and associated circuitry. The RFID reader then recognizes the RFID tag as valid and the box can be opened.

In the present embodiment, if the foregoing steps are followed, the box can be opened at any time by the person who holds the RFID tag. This aspect of the present invention advantageously allows the authorized person to avoid the trouble of obtaining a code for each opening of the box. The number of times that any one RFID tag can be used before a new code is needed to open the box and allow that or another RFID tag to be used can be programmed into the electronic device. For instance the electronic device may only allow 10 openings with any one tag before a new code is needed. When the authorized person (who may or may not be the owner of the box) no longer wishes to have that person who holds the RFID tag have access to the box, the box can be reprogrammed by obtaining a new valid code, entering it in the code receiving device attached to the electronic device and holding a new RFID tag over the RFID reader.

Alternatively, or in combination with the foregoing, the code may be entered in the code receiving device and no RFID tag held over the RFID reader, in which case no RFID tag will be recognized and the box will then only open with a code until the next RFID tag is presented to the RFID reader after a valid code.

In another mode of use, a RFID reader is present in the unit of value that can read RFID tags attached to or associated with goods or objects or documents contained in the unit of value. The RFID reader may store or cause to be stored, in an adjacent electronic, optical, or opto-electronic memory device, information pertaining to those RFID tags present in the unit of value such as the RFID tag identification numbers.

Information may be sent to the control computer by suitable local area, metropolitan area, and/or wide area communication means to allow the control computer to operate in the same way as the electronic device in the unit of value as described below. The means by which this information is send to the control computer may be as described in the '279 patent.

RFID identification numbers so stored may be summed or processed by some suitable algorithm to create a unique number. This unique number may then be applied to the table of codes to increment or decrement the index from its position in the table when the unit of value was last accessed to a new position in the table. In this mode of use, the index position for the next opening code will therefore be set by the function of the summation or other algorithm, created by the method described above on the index position, and will be at a unique index position for each group of contents in the unit of value as each group of contents may have a unique set of RFID tags which in turn, create the unique numeric basis from which to increment or decrement the table of codes index from its current table position. Therefore, each group of contents within a given container or physical/logical container group so calculated, yields a plurality of unique index positions in the table of codes at the moment of increment/decrement position calculation.

By this means there will be no predictability of what the next valid code will be as even someone with access to the table of random digits used to create codes in the control computer will not know what the next valid code will be in the table of codes as the index position that forms the start point of the next code will be "content dependent"; content dependent being used to describe possibly a unique number created by the function carried out on the IDs of the particular RFID tags of that present group of contents in the unit of value.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF THE PREFERRED EMBODIMENTS

Figure 1:
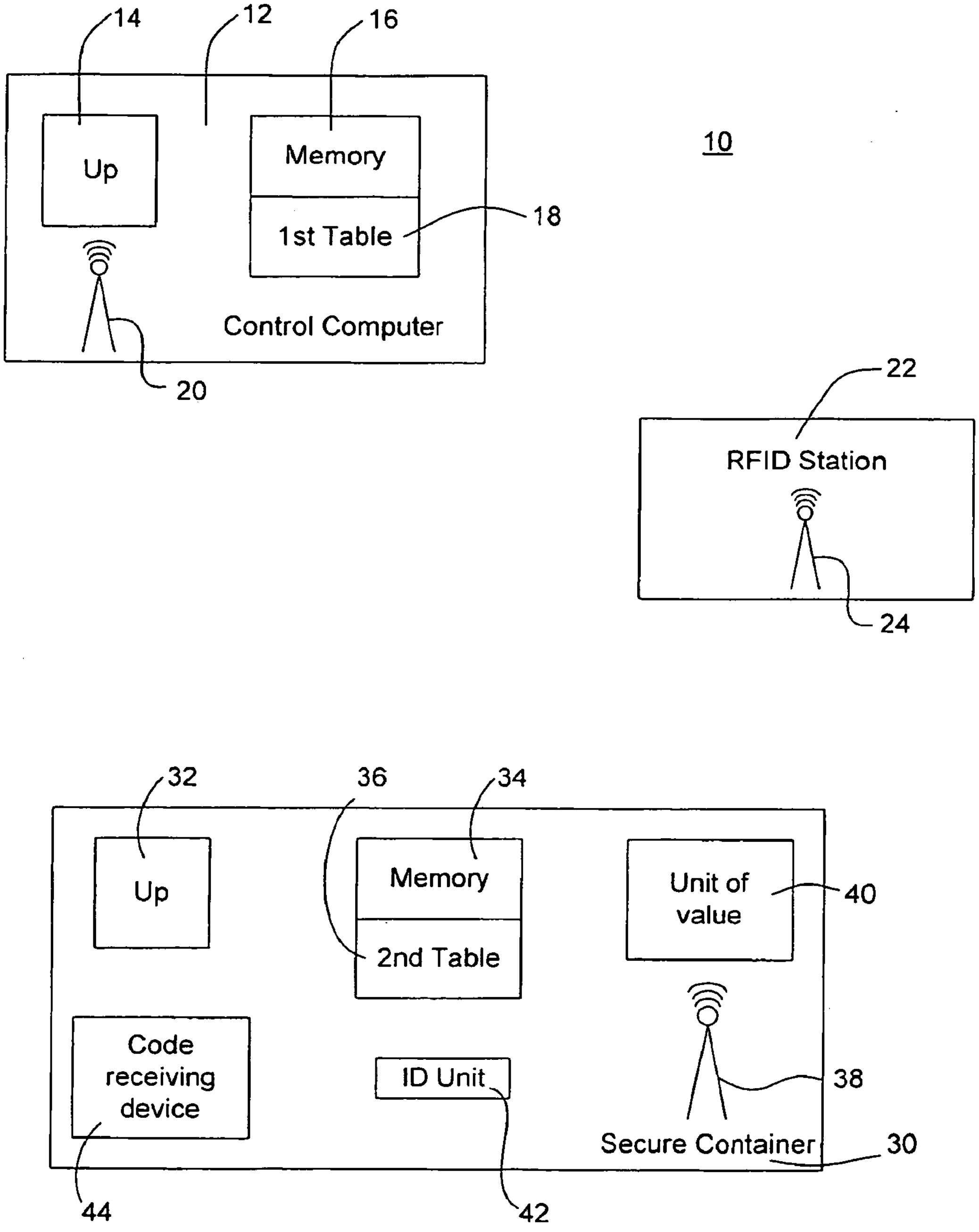
FIG. 1 is a somewhat schematic diagram of a system in accordance with the subject technology.

The present invention overcomes many of the prior art problems associated with implementing security systems and methods, and more particularly, to implementing electronic, optical, and/or opto-electronic devices that provide a simple yet secure means of controlling access to a unit of value which may include objects, containers having bodies and a cavity for holding and storing items, spaces such as rooms, buildings or secure areas, information, or other items. The advantages, and other features of the components and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. All relative descriptions herein such as left, right, up, down and the like are with reference to the Figures, and not meant in a limiting sense.

The following description contains examples to illustrate types of non-limiting scenarios and applications in which the present invention may be employed. One skilled in the art will readily appreciate that the present invention can be employed in other situations in well.

In brief overview, a commercial entity that has valuable goods wishes to transport these goods in a secure container that may be a box or similar package that can be locked with an electronic lock. The commercial entity requires that the secure container be opened at the destination by an authorized person or entity and not be opened in transit without the authorized person or the entity's knowledge or permission.

Referring now to FIG. 1, there is shown a somewhat schematic diagram of an environment 10 with a system embodying and implementing the methodology of the present disclosure. The system allows the commercial entity to control access to a package containing a unit of value. The following discussion describes the structure of such an environment 10 but further discussion of the methodology is described elsewhere herein.

The environment 10 includes one or more computers 12, which communicate with other devices via communication channels, whether wired or wireless, as is well known to those of ordinary skill in the pertinent art. Preferably, the commercial entity owns and operates the computers 12 and for simplicity only one is shown and described. The control computer 12 has a processor 14 for executing instructions stored in the memory 16. The memory 16 also houses multiple databases including a table 18 of randomly generated codes in accordance with the subject invention. The control computer 12 also includes a networking device 20 for communicating with other devices in the environment 10.

The environment 10 also includes a plurality of check points 22 such as an RFID station, desktop computer with a scanner, and the like. Again for simplicity, only one check point 22 is shown but it is envisioned that the commercial entity would own and operate a great number of check points at destinations and intermediate points. The check point 22 allows the commercial entity to monitor the movement of and control access to the components within the environment 10. The check point 22 can vary in configuration significantly and still perform the desired function. The check point 22 also includes a networking device 24 for communicating with other devices in the environment 10. Accordingly, the check point 22 exchanges information with the control computer 12.

The commercial entity also has a plurality of secure containers 30 that interact with the check point 30 and, for simplicity, only one secure container 30 is shown. In one embodiment, the secure container 30 has a processor 32 for executing instructions stored in memory 34, which also houses multiple databases including a table 36 of randomly generated codes. The secure container 30 also includes a networking device 38 for communicating with other devices in the environment 10. In a preferred embodiment, the networking device 38 is an RFID tag that can be read by the check point 22. The secure container also has an identifier unit 42 and code receiving device 44 for facilitating proper operation of the locking features.

The secure container 30 may be sized and shaped to hold a multitude of various items. Whether one or more items are placed in the secure container 30, the items are collectively referred to as a unit of value and referred to generally by reference numeral 40. Typically, the commercial entity is charged with delivering the unit of value 40 from one location to another. Each location would likely have a check point 22 as well as providing check points 22 at a plurality of intermediate locations along the route of the secure container 30. As can be seen, the environment forms a distributed computing network as would be well known to those skilled in the art. The distributed computing network is formed between the multiple computers 12, check points 22 and secure containers 30. The distributed computing network may be a combination of local area networks (LAN), wide area networks (WAN), the Internet or like systems now known or later developed.

In short, when the secure container 30 is loaded with a unit of value 40, the secure container 30 is locked and subsequently picked up by a courier to transport to the destination. The secure container 30 has the identifier or electronic device identifier unit 42. At the destination, an authorized person or entity receives the secure container 30 and contacts the control computer 12 through multiple possible communication means, including, but not limited to, any of telephone contact with an authorized control computer operator, via email, voice recognition, cell phone texting, personal digital assistant (PDA) texting, or some other suitable electronic or optical communication means using the networking device 24 of the check point 22. The authorized person or entity obtains an access code from the control computer 12 that when input into the secure container 30, by the code receiving device 44, is recognized as valid and allows the authorized person or entity to open the secure container 30 to retrieve the unit of value 40.

In yet another embodiment, instead of or in addition to the feature noted above, the environment includes a RFID card or tag 48. The secure container 30 has a RFID reader as part of the code receiving device 44. The RFID reader sends a signal to the locking mechanism to allow access to the unit of value 40, when the RFID reader recognizes the electronic signature of the one particular RFID card or tag 48. Similarly, it is envisioned that the environment would include a plurality of RFID tags as desired to implement the subject technology on a large scale.

In one embodiment, to enable the RFID cards and/or tags, the secure container 30 has a START key (not shown). Upon pressing the START key, the microprocessor 32 activates the RFID reader, the RFID reader reads the RFID tag in proximity thereto, and then if a correct code is entered while the RFID reader is reading the RFID card or tag, the microprocessor 32 will then accept that RFID card as able to open the locking mechanism. In one embodiment, the RFID card will expire after a preset number of uses, such as ten. If further access with the card is still desired, then the activation procedure is repeated. In another embodiment, the RFID reader is preferably programmed to recognize the electronic signature on a particular RFID card or tag 48 when a valid code or reset programming code stored in the memory 34 is received by the microprocessor 32. Preferably, a time limit requires the particular RFID card or tag 48 is presented to the RFID reader within a predefined time following the receipt of the reset programming code by the microprocessor 32. A reset programming code instructs the RFID reader to no longer recognize the electronic signature of a previous RFID tag as valid and to read and only recognize as valid the electronic signature of the next RFID card or tag presented thereto. In this way, the table 36 of codes may be used to allow the RFID reader to be updated. Once updated, the RFID reader and microprocessor 32 will only send a signal to the locking mechanism to allow access to the unit of value when the RFID card or tag 48 that has been validated, such as by the method described above, comes in proximity thereto. Thus, in this embodiment, the RFID reader is used both to program the microprocessor if the RFID reader has a RFID card or tag presented thereto within a pre-defined time and to allow access to the unit of value 40 when such card is presented.

Once updated with a new RFID card or tag 48, the microprocessor 32 allows access whenever that RFID tag 48 is presented to the RFID reader and no code will be required to be entered. However, if no RFID card or tag 48 is presented to the RFID reader, entry of a valid code will also allow access to the unit of value 40. In another embodiment, a class is created by allowing a plurality of RFID tags 48 to each open the secure container(s) 30. As such, each RFID tag 48 is associated with a person and by tracking the RFID tag 48 used to open the container 30, it can be seen who had access in the event of pilferage or other mishap. Similarly, the check points 22 can have unique signature information included, such as identification of the station operator, to track others time and place of access to the unit of value 40 as well.

Figure 2:
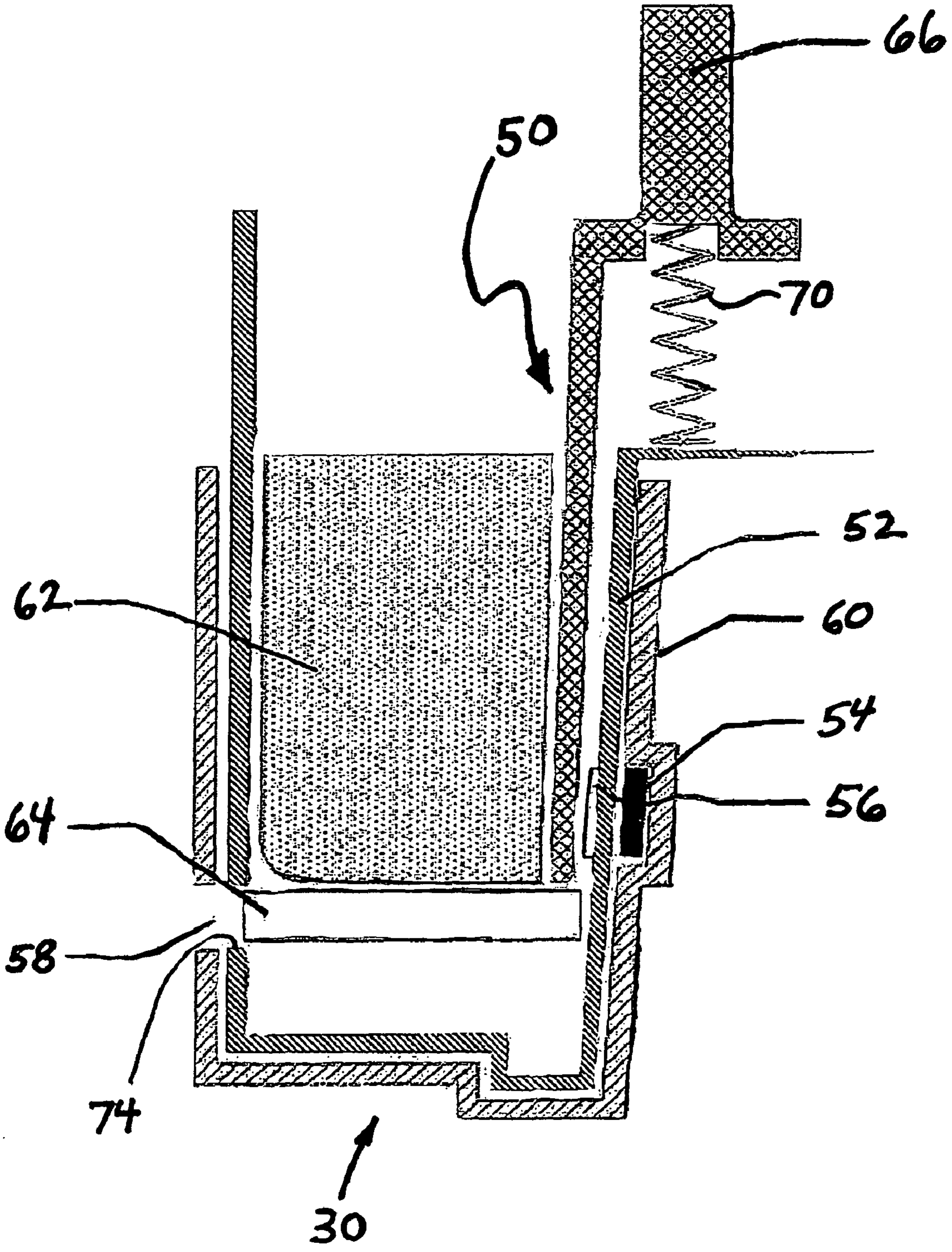
FIG. 2 is a cross-sectional view of a locking mechanism for a secure container in an unlocked position in accordance with the subject technology.
Figure 3:
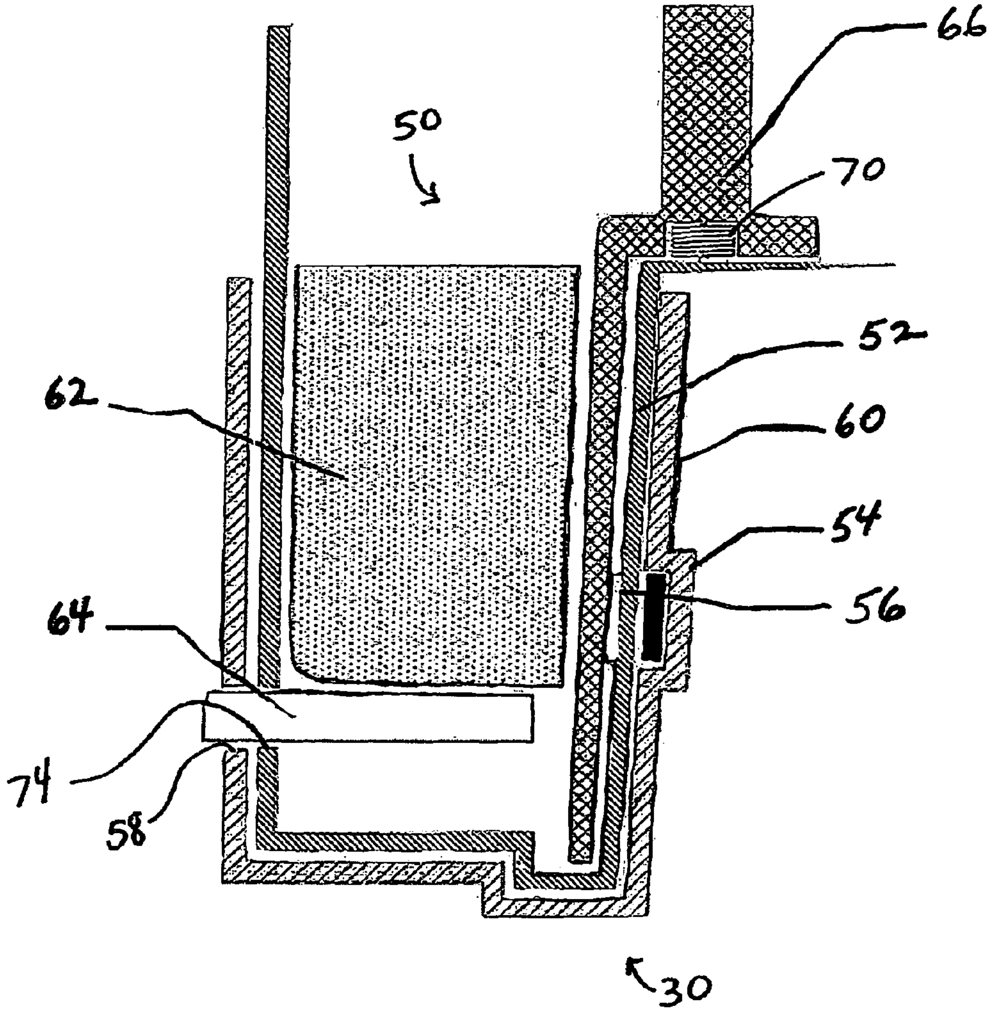
FIG. 3 is a cross-sectional view of a locking mechanism for a secure container in a locked position in accordance with the subject technology.

Referring now to FIGS. 2 and 3, an exemplary embodiment of a secure container 30 is shown in more detail albeit somewhat schematically. The present disclosure is also directed to a locking mechanism 50 for use with the secure container or storage device 30. A generally box-like container 30 is used for purposes of illustration of the present embodiment but it is to be appreciated that the locking mechanism 50 could control access to a room, panel, compartment or other area whether stationary or mobile, or large or small.

Briefly, the secure container 30 includes a box (not shown) with an interior for retaining the unit of value 40. The secure container has a lid (not shown) for enclosing the interior and preventing access to the unit of value 40. A locking mechanism 50 selectively allows the lid to move between a closed position and an open position. The locking mechanism 50 includes a first housing, male wall, male receptacle or male housing 52 mounted to the lid of the container 30.

A second housing or female receptacle 60 mounts to the interior of the box and, when in the closed position, has the male housing 52 nesting there within. The first male housing 52 has an actuation mechanism 62 for selectively moving a lever 64 into and out of a locking slot 58 formed in the second female receptacle 60. The first male housing 52 has a switch 56 which is actuated when the magnet 54 on the female receptacle 60 comes in proximity to it. This occurs when the lid is closed. Actuation of this switch 56 generates a signal for the electronic device to instruct the actuation mechanism to move the lever 64 into the locking slot 58.

A button 66 slidably mounts and extends through a hole (not shown) formed in the lid such that the button 66 has can be depressed when the lever 64 has moved to the locked position in the locking slot 58. When the lid is in the unlocked position, the button 66 cannot be depressed because the lever 64 blocks the button 66 from moving to the locked position. In the closed position, the lever 64 is in the locking slot 58 to retain the lid. To open the secure container 30 from the closed position, the actuation mechanism 62 moves the lever 64 from the locking slot 58 based upon receipt and validation of a code as described herein.

The locking mechanism 50 preferably includes the electronic actuation mechanism 62, the microprocessor 32, the memory 34 and a code receiving device 44. The locking mechanism 50 is contained on the inside of the secure container 30 and only releases when an appropriate code is received by the code receiving device 44 that supplies opening codes to the processor 32, which in turn activates the electronic actuation mechanism 62 to move the locking lever 64.

In a preferred embodiment, the secure container 30 may be used for transporting valuable goods as closing the lid automatically locks the secure container 30. If the secure container 30 is so shaped as to only just fit in a larger courier box (not shown) when the lid is closed, the button 66 will be depressed by the larger courier box. If the button 66 cannot be depressed, the larger courier box cannot be closed. Thus, the loader, the courier and the receiver of the secure container 30 know that the secure container 30 was in fact locked when dispatched in the larger courier box if the larger courier box was properly closed.

Preferably, the secure container 30 has a hinged lid. The lid may also be fastened with external clips or other attachments external to the secure container 30 and lid to reinforce the lid closed position and equivalent structure now known and later developed by those of ordinary skill in the pertinent art.

The locking mechanism 50 may fit in two compartments, fitted inside the secure container 30. The male portion or housing 52 is attached to the inside surface of the box lid, or alternatively on an inside wall of the secure container 30. Preferably, the male housing 52 contains the electronic activation mechanism (e.g., the processor 32, memory 34 and code receiving device 44) that controls the locking mechanism 50. The locking status indicator button 66 with a spring for biasing the button 66 out of the secure container 30, and a battery (not shown) to supply power to the electronic activation mechanism and the locking mechanism 50.

The locking mechanism 50 consists of an electro-mechanical mechanism that powers a locking lever 64 to rotate from the locked position, as shown in FIG. 2 to the open position shown in FIG. 3, and, thereby, release the locking action to allow the box lid to open. The electro-mechanical mechanism rotates that locking lever from an open to a closed position when the box lid is closed to engage the locking action and so lock the box.

The locking status indicator button 66 protrudes through the box lid and is shaped such that is can only be depressed when the locking lever 64 is in the closed or locked position as shown in FIG. 3. If the locking indicator button 66 is up and cannot be depressed, the locking lever 64 has not moved into the locked (closed) position when the box lid has been shut. The failure of the locking lever 64 to move into the locked position may be because of a deliberate attack on the integrity of the secure container 30 by impeding or obstructing the movement of the locking lever 64 into the locked position. Additionally, it may be because of a failure of the electronic activation mechanism or locking mechanism 50.

In either case, the locking indicator button 66 will not be able to be depressed. If the secure container 30 is used for transporting valuable goods, it will be very difficult to fit the secure container 30 into a larger courier box with the locking indicator button 66 up; as to fit in the larger courier box without displacing the walls of the courier box the secure container 30 will have to have the locking indicator button depressed as the secure container 30 is slid into the larger courier box. The secure container 30 will therefore not be able to be used inside the courier box for secure transport in an insecure condition without an individual or system component noticing that the courier box has a wall displaced; that is, with the locking lever 64 unlocked.

A female part or housing 60 is attached to an inside wall of the secure container 30, or alternatively on the inside surface of the lid. The female part 60 is shaped to receive the male part 52 in a partially nesting manner when the box lid is closed. The female part 60 defines a slot 74 aligned with the locking slot 58 to receive and trap the locking lever 64 of the locking mechanism 50 as shown in FIG. 2. The female part 60 has also the magnet 54 embedded in one wall which triggers the reed relay switch 56 on an electronic printed circuit board (not shown) in the male part 52 when these come into proximity.

The code receiving device 44 that supplies appropriate codes to the electronic activation mechanism is operatively associated with the aforementioned locking mechanism 50. The code receiving device 44 may be a keypad mounted on the outer surface of the lid or alternatively on an outer wall of the secure container 30. Alternatively, the code receiving device 44 may take another form such as a wireless or acoustic receiving device that is fitted within the secure container 30 and supplies codes to the electronic activation mechanism and like variations as would be known to those of ordinary skill in the pertinent art.

Figure 5:
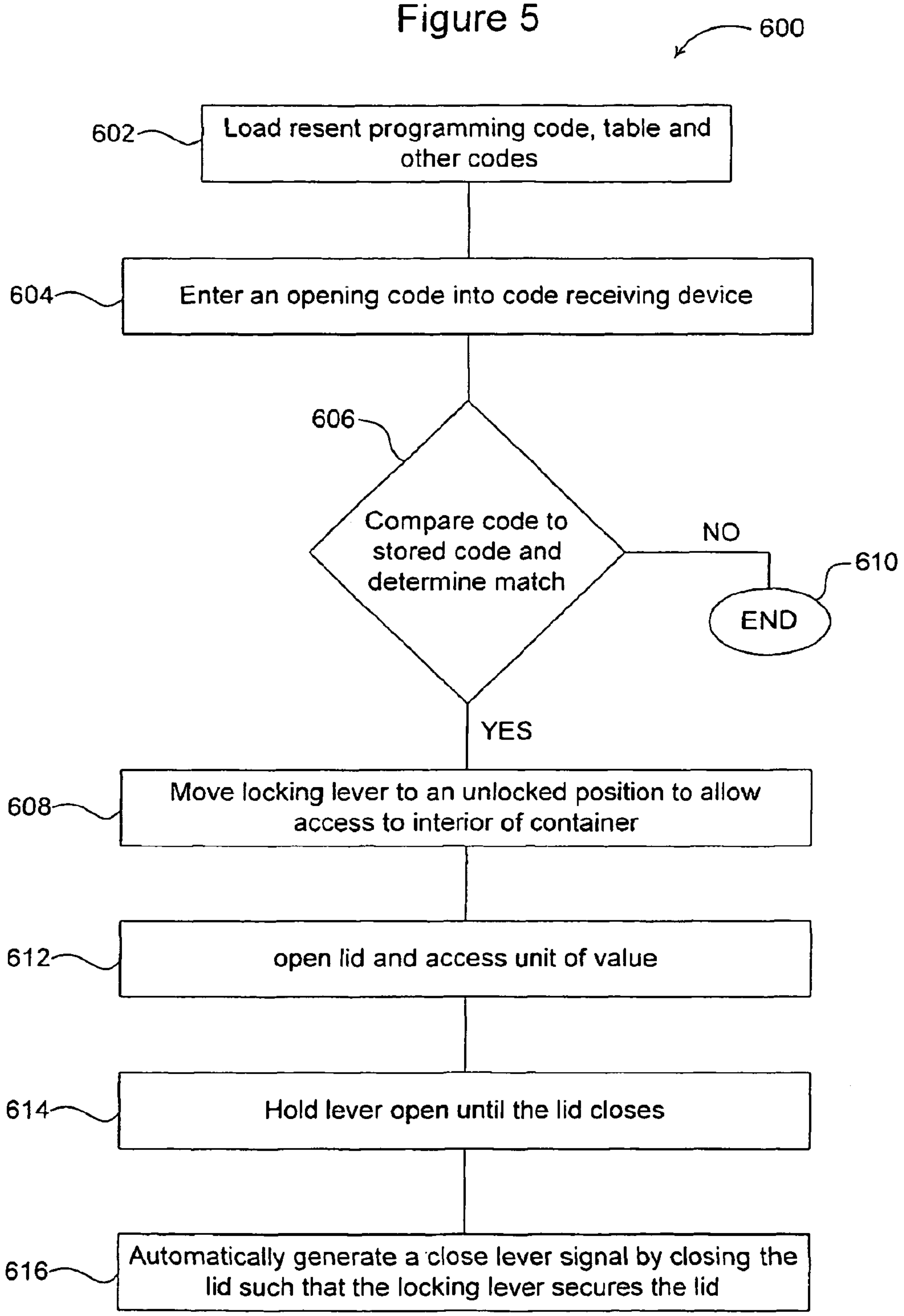
FIG. 5 illustrates a flowchart for a process of securing a container in accordance with the subject technology.

Referring now to FIG. 5, there is illustrated a flowchart 600 depicting a process for opening and closing a secure container 30 within the environment 10 in accordance with the subject technology. The flowchart 600 herein illustrates the structure or the logic of the present technology, possibly as embodied in computer program software for execution in the environment 10 using components like a computer, digital processor or microprocessor. Those skilled in the art will appreciate that the flowchart illustrates the structures of the computer program code elements, including logic circuits on an integrated circuit, that function according to the present technology. As such, the present invention is practiced in its essential embodiment(s) by a machine component that renders the program code elements in a form that instructs a digital processing apparatus (e.g., microprocessor) to perform a sequence of function step(s) corresponding and/or equivalent to those shown in the flowchart.

At step 602, the container 30 is loaded with the codes and instructions necessary for proper operation. As noted above, the container 30 may be loaded with a reset programming code, signature codes from RFID tags 48 and other tables of codes. Of course, the secure container 30 is also loaded with the unit of value 40 and locked. At step 604, when the secure container 30 is to be opened, a correct opening code is entered into the code receiving device 44. The opening code is received by the processor 32 of the electronic activation mechanism. The opening code may be passed from the control computer 12 to the check point 22 in response to a proper request for same. Alternatively, the opening code may come from an RFID tag read by the code receiving device 44. At step 606, the processor 32 compares the opening code to a stored code retrieved from memory to determine if the codes are the same or equivalent. If the codes do not match, the process stops at step 610. At step 608, if the codes are a match, the processor 32 prompts electrical impulses to the electro-mechanical mechanism to cause the locking lever 64 to rotate to the open position. At step 612, the box lid can then be opened. Preferably, the button 66 is normally biased outward unless externally depressed. In another embodiment, the button 66 will latch within the container 30 and be released or reset upon each opening of the container.

At step 614, the electro-mechanical mechanism holds the locking lever 64 in the open position until an electrical impulse is received from the electronic activation mechanism to move the locking lever 64 to a closed position. At step 616, this electrical impulse is automatically generated by the electronic activation mechanism to move the locking lever 64 to a closed position when the box lid is closed. As shown in this embodiment, one way that this may be effected is to have the reed relay switch 56 generate a signal when placed adjacent to the magnet 54. The magnetic field of the magnet 54 causes the reed relay switch 56 to close and this completes an electronic circuit that causes the electronic activation mechanism to send an electrical impulse to the electro-mechanical mechanism to cause the electro-mechanical mechanism to rotate the locking lever 64 into the closed position. Therefore, every time the box lid is closed the locking mechanism 50 locks the lid in the closed position and another opening code will be required to open the box lid. It should be readily apparent to one skilled in the art that other systems and methods in lieu of a reed relay switch be employed in accordance with the present technology.

Figure 4:
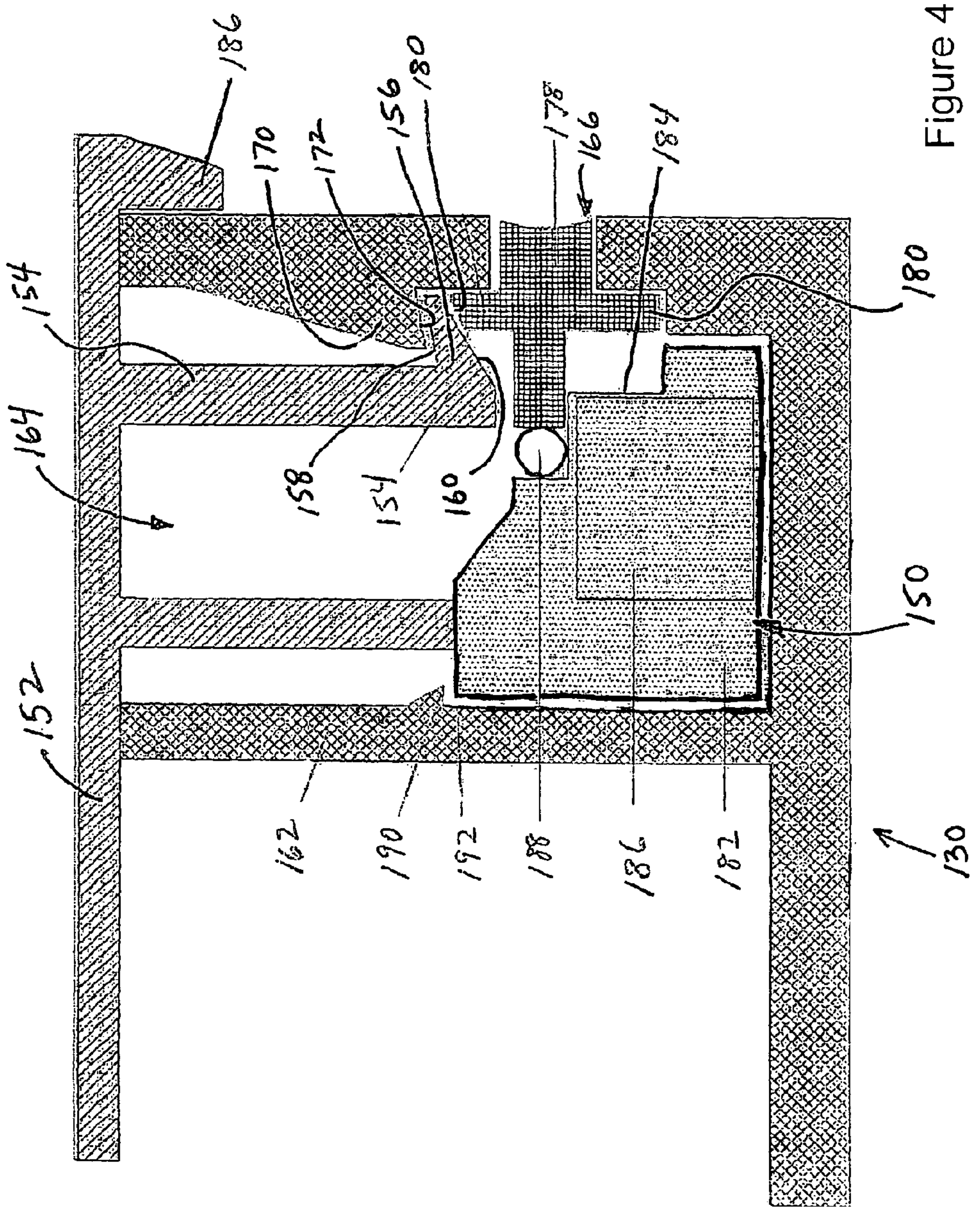
FIG. 4 is a cross-sectional view of another secure container in a locked position in accordance with the subject technology.

Referring not to FIG. 4, a cross-sectional view of another embodiment of the secure container 130 and locking mechanism 150 constructed in accordance with the present invention is illustrated. The locking mechanism 150 engages when the box lid 152 is closed. The locking mechanism 150 is preferably contained on the inside of the box and will only release the lock when an appropriate code is received by a code receiving device that supplies opening codes to an electronic activation mechanism that activates a solenoid or electromechanical device to release the locking mechanism. The locking mechanism 150 may fit in a compartment inside the front wall of the secure container 130.

The locking mechanism 150 includes a flexible arm 154 depending from the lid 152 of the secure container 130. A protrusion 156 that forms opposing surfaces, one of said surfaces being an arm ledge 158 and the other a camming or sloped surface 160. A housing 162 within the container 130 defines a compartment 164 for retaining components of the locking mechanism 150 and a housing hole 166. A protrusion 170 on the housing 162 has a housing ledge 172 within the compartment 164 for selectively engaging the arm ledge 158 when the lid 152 is closed. A button 178 slidably mounts and extends into the compartment 164 via the housing hole 166, wherein the button 178 forms a button ledge or sloped surface 180 to engage the camming surface 160 and, in turn, dislodge the flexible arm 154 from the housing ledge 172 to allow opening the lid 152. A collar 180 is disposed on the button 178 for retaining the button 178 within the housing hole 166. A receptacle 182 within the compartment 164 forms an inward stop surface 184 for the collar 180 of the button 178. A solenoid 186 coupled to the receptacle 183 for moving a pin 188 between a locked position in which the button 178 is prevented from actuation and an unlocked position in which the button 178 can be activated. Preferably, the ledges 158, 172 are shaped to create similar but reciprocal complementary shapes. A further protrusion, overlap or rim 186 on the lid 152 extends downward to prevent tampering. The button 178 that fits in the hole 166 in the front wall of the container 130 that when pushed in adequately will disengage the ledge of the lid from the ledge of the inner front wall to allow the lid to be raised and opened. The button 178 may be part of a horizontal bar that sits in a recess in the inner face of the front wall of the container 130 that makes contact with the box lid protrusion 156 along a surface thereof.

The button 178 and or horizontal bar has a sloped surface 180, which engages against the reciprocal sloped surface 160 on the lid protrusion 156. The reciprocal sloped surface 160 acts to push the button 178 out into the ready to open position when the box lid 152 is closed and in effect acts as a return spring on the button 178 to return the button 178 to the "ready to open" state.

Until retracted by the solenoid 186, the pin or pins 188 impedes the movement of the button/bar 178. The pin 188 is retracted by the solenoid 186 when the solenoid 186 is activated by an electrical impulse from an electronic activation mechanism contained in the locking mechanism 150. The pin 188 is preferably retracted for a short period of time by the electrical impulse and then returns to the extended position.

The electronic activation mechanism includes appropriate power supply (not shown) that supplies electrical impulses to the solenoid 186 when it receives an appropriate code to do so. This includes a code-receiving device that supplies appropriate codes to the electronic activation mechanism. The electronic activation mechanism, code receiving device (not shown) and solenoid 186 with pin 188 sit in a receptacle 182 bounded by the inner surface of the front wall of the container 130, the floor of the container 130 and an inner wall that separates the container closing mechanism described above partially or fully from the rest of the inside of the container 130. The receptacle 182 may be removable to allow the electronic activation mechanism to be replaced as new improved versions become available or as its life expires. The wall of the receptacle 182 has stop surface 184 opposite the inner front wall of the container 130 to act as a stop to prevent the opening button/bar 178 from moving too far inwards when depressed in an opening activation.

The receptacle 182 is able to slide into place on the inner surface of the front wall of the container 130 past the opening button/bar 178 during assembly. The receptacle 182 is held in place with a retention lug 190 on the front surface of the inner wall of the locking mechanism. The receptacle 182 has a tamper switch 192 mounted to detect forced openings of the lid 152 of the container 130 without a code. The tamper switch 192 activates a small tamper indication light (not shown) if a forced opening is made to alert an authorized person later opening the container 130 with a code that in fact an unauthorized opening has been made. The lid 152 has a projection or overlap 186 that overlaps the front wall of the container 130 to prevent the lid 152 being pried up off the front wall.

On receipt of the container 130 at the required destination, the person who receives the container 130 can check if the container 130 appears in good condition and is locked. The person who receives the container 130 can then obtain an opening code for the container 130 from the control computer 12 by using the check point 22 and enter the open code into the code-receiving device to supply the code to the electronic activation mechanism for that mechanism to activate the solenoid to withdraw the pin 188.

When the pin 188 is withdrawn by the solenoid 186, the button 178 can be pushed in adequately to disengage the ledges 158, 172 that lock the lid 152 to the inner wall of the container 130. The lid 152 can then be opened. On opening, the person who receives the container 130 can check if the tamper indicator light is on. If the light is out, he knows that the container 130 was unopened during transport.

In another illustrative embodiment, the unit of value is a box having a RFID reader adjacent to the electronic device in the box. The code receiving device communicates with the electronic device. For purposes of illustration of the features of this embodiment, the code receiving device includes a keypad mounted on the lid of the box. To program the RFID reader in the box, an authorized person who may be the owner of the box or employed by a commercial entity must enter a valid code in the keypad, which must first be retrieved from a code delivery device, preferably a code loading computer in a remote location from which a control computer 12. The valid code instructs the RFID reader in the box that the next RFID tag that it will read is the valid RFID tag to open the box.

The person who is authorized to open the box uses a RFID tag to open the box by holding the RFID tag close to the keypad. In one embodiment, the person may first be required to press a START key to energize or wake up the RFID reader and associated circuitry. The RFID reader then recognizes the RFID tag as valid and the box can be opened. In one embodiment, if the foregoing steps are followed, the box can be opened at any time by the person who holds the RFID tag. This aspect advantageously allows the authorized person to avoid the trouble of obtaining a code for each opening of the box. The number of times that any one RFID tag can be used before a new code is needed to open the box and allow that or another RFID tag to be used can be programmed into the electronic device. For instance the electronic device may only allow ten openings with any one tag before a new code is needed. When the authorized person (who may or may not be the owner of the box) no longer wishes to have that person who holds the RFID tag have access to the box, the box can be reprogrammed by obtaining a new valid code, entering it in the code receiving device attached to the electronic device and holding a new RFID tag over the RFID reader. Alternatively, or in combination with the foregoing, the code may be entered in the code receiving device and no RFID tag held over the RFID reader, in which case no RFID tag will be recognized and the box will then only open with a code until the next RFID tag is presented to the RFID reader after a valid code.

Figure 6:
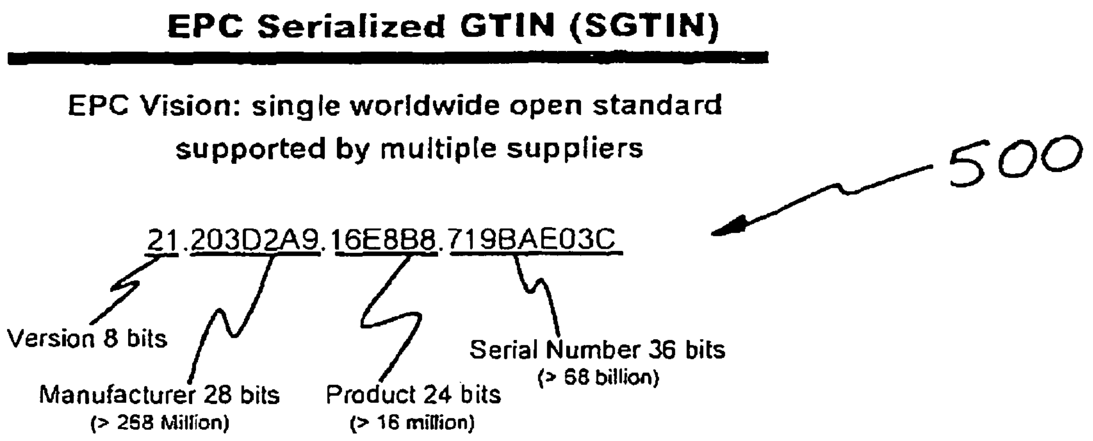
FIG. 6 is a generalized view of an Electronic Product Code Serialized Global Trade Item Number.

Referring now to FIG. 6, illustrates a generalized view of an Electronic Product Code (EPC) Serialized Global Trade Item Number (SGTIN) 500. EPC is a global numbering scheme designed to identify objects using a number that can uniquely identify any item in a supply chain. EPC in turn, is one specific application of one specific type of RFID technology within the Consumer Packaged Goods Industry. EPC tags are an expanded "serialized" electronic version of a Universal Product Code (UPC) bar code using RFID technology. GTIN is the foundation for a globally unique European Access Network Uniform Commercial Code (EAN.UCC) system for uniquely identifying trade items (products and services) sold, delivered, warehoused, and billed through retail and commercial distribution channels. GTIN is a numeric data structure containing multiple possible digits including for example, 8-, 12-, 13-, or 14-digits.

In one embodiment, a plurality of RFID tags is physically or logically associated with a plurality of goods, objects, and/or documents contained in a unit of value, where each RFID tag enables a plurality of possible EPC SGTIN numbers, and where the plurality of GTIN numbers each provides unique values when right-justified within an n-digit database field enabling. For example, any combination of UCC-12 (twelve digits), EAN/UCC-13 (thirteen digits), EAN/UCC-14 (fourteen digits), and/or EAN/UCC-8 (eight digits), and where the plurality of GTIN values may be encoded in a plurality of schemes including, for example, EAN/UPC, ITF-14, and/or UCC/EAN-128 symbologies, and where the selected data structure and symbology combination is multi-factor determinate, such as product type, supply channel, container category, and product packaging.

In another embodiment, a plurality of check digit calculation algorithms—Modulo-n—is performed on a plurality of GTIN numbers associated with a plurality of RFID tags physically or logically associated with a plurality of goods, objects, and/or documents contained in a unit of value, for example, Modulo 2, Modulo 10, Modulo 11.

In still another embodiment, the final digit of a GTIN or UPC is a check digit calculated in a manner that the result of summing the even-numbered digits, plus (1-n) times the odd-numbered digits, modulo 2, modulo 10, or modulo 11 equals 0. For example, a 14-digit GTIN set to 00745151000012 is calculated modulo 10 where [Σ even-numbered digits]+[4×Σ odd-numbered digits], modulo 10=0, for example: Σ even-numbered digits 0+4+1+1+0+0+2=8; Σ odd-numbered digits 0+7+5+5+0+0+1=18; total Σ 8+(4×18)=80=0 modulo 10. As a result, a plurality of codes to open the secure container are calculated on a stationary or mobile cargo content-specific basis, wherein a plurality of calculated check digits are summed successively in modulo-n arithmetic followed by an Exclusive OR (XOR) logic operation, where the XOR logic operation outputs a sum modulo-n based on inputs, and wherein a remainder modulo-n generates a content-specific code increment/decrement offset. For example, a container is loaded with goods at origin A and, in route to destination B, the contents are modified at intermediate location X. The modification of the objects at location X by opening the container causes a dynamic recalculation of the next opening code based upon the modification of the goods. Thus, the modification would be known at destination B upon interrogation (e.g., a remote check of the RFID/locking mechanism of the container or a check of the control computer). Based upon the modification, an increment, decrement or change in the opening code is made. Thus, the system recognizes that the contents arriving at destination B are different than was shipped at origin A. Such a system is particularly beneficial for application in forensic evidence lockers, domestic and international ports, airports, transportation hubs and the like.

In another embodiment, the check digit of a GTIN or UPC is reverse-calculated into the n-digit GTIN or UPC value to pre-set the modulo-n arithmetic scheme employed to derive the result 0 modulo-n. In another embodiment, the plurality of check digits calculated are summed successively in radix-2 and radix-10, followed by an EXCLUSIVE OR (XOR) logic operation using modulo-2 arithmetic (where the XOR operation outputs the sum modulo 2 of its inputs, in this case, the successive summation of check digits). In yet another embodiment, the resulting remainder from the XOR operation is converted to its radix-10 counterpart, where the result generates the index increment/decrement offset.

As described above, the present invention is also directed to a locking mechanism on a container such as a box, package, storage device or carrier of any shape. The locking mechanism is preferably engaged when the carrier lid is closed. Preferably, the locking mechanism is contained on the inside of the carrier and will only release the locking when an appropriate code is received by a code-receiving device that supplies opening codes to an electronic activation mechanism that activates an electromechanical device to release the locking mechanism.

As described above, the present technology is also directed to a locking mechanism on a container such as a box, package, storage device or carrier of any shape. The locking mechanism is preferably engaged when the carrier lid is closed. Preferably, the locking mechanism is contained on the inside of the carrier and will only release the locking when an appropriate code is received by a code-receiving device that supplies opening codes to an electronic activation mechanism that activates an electromechanical device to release the locking mechanism.

Those skilled in the art will also readily appreciate that a system in accordance with the present disclosure may include the various computer and network related software and hardware typically used in a distributed computing network, that is, programs, operating systems, memory storage devices, input/output devices, data processors, servers with links to data communication systems, wireless or otherwise, such as those which take the form of a local or wide area network, and a plurality of data transceiving terminals within the network, such as personal computers or handheld devices. Those skilled in the art will further appreciate that, so long as its users are provided local and remote access to a system in accordance with the present disclosure, the precise type of network and associated hardware are not vital to its full implementation.

The exemplary embodiment described above should not be considered as limiting of the system and method of the present invention in any way. Accordingly, the present invention embraces alternatives, modifications and variations of the present invention as fall within the spirit of the present disclosure as described herein. Thus, various changes and/or modifications can be made to the invention without departing from the spirit or scope of the invention as defined by the appended claims.

What is claimed is:

1. A method for accessing an interior of a secure container comprising the steps of:

calculating a plurality of codes to open the secure container on a stationary or mobile content-specific basis, wherein a plurality of calculated check digits are summed successively in modulo-n arithmetic followed by an Exclusive OR (XOR) logic operation, where the XOR logic operation outputs a sum modulo-n based on inputs, and wherein a remainder modulo-n generates a location-specific code increment/decrement offset;

receiving one of the an opening codes into a code receiving device associated with a locking mechanism of the container; comparing the opening code with a box code stored in the locking mechanism to determine if a match occurs; if a match occurs, releasing the locking mechanism to allow opening of a lid for the secure container and, thereby, access to the interior.

2. A method as recited in claim 1, further comprising the step of automatically locking the locking mechanism upon closing the lid.

3. A method as recited in claim 1, further comprising the step of initially reading the box code from an RFID card with a RFID reader coupled to the secure container to enter the box code, wherein the subsequent entering of the opening code is by scanning the RFID card with the RFID reader.

4. A method as recited in claim 1, further comprising the step of allowing the opening code to work only once.

5. A method as recited in claim 1, further comprising the step of allowing the opening code to work a predefined number of times.

6. A method as recited in claim 1, further comprising the step of allowing the opening code to work until another code is input and another predefined event occurs.

7. A method as recited in claim 1, wherein the opening code and the box code are a series of identical codes to be used sequentially.

8. A method as recited in claim 1, wherein the locking mechanism has an electronic device containing a code table of randomly generated or pseudo-randomly generated digits forming a series of codes; and further comprising the step of recognizing any one of a specific plurality of sequential codes after an index position in the code table as valid codes.

9. A method as recited in claim 8, further comprising the step of using the code table of randomly generated or pseudo-randomly generated digits to form a series of codes such that when the index position reaches an end of the code table, the index position moves to a new start position in the code table and generates a new series of codes different from any other of a plurality of series of codes.

10. A method as recited in claim 9, further comprising the step of using a resynchronization code to resynchronize the series of codes in the code table by instructing the index position in the electronic device to move to a specific position in the series described by a pointer number input following the resynchronization code.

11. A method as recited in claim 10, wherein the resynchronization code is input into the electronic device and the index in the electronic device will not move to the specific position in the series described by the pointer number following the resynchronization code until a specific event occurs.

12. A method as recited in claim 11, wherein a resynchronization code for an electronic device cannot be obtained from the control computer until a specific event occurs such as input to the control computer from a specific RFID reader or other predetermined event.

13. A method as recited in claim 12, wherein input from an RFID reader effects a change in the position of the index in the table of digits.

14. A method for accessing an interior of a secure container comprising the steps of:

calculating a plurality of opening codes on a stationary location-specific basis or mobile location-specific basis through physical and/or logical association of a plurality of RFID tags and/or RFID readers in a plurality of locations, wherein each RFID tag and/or reader enables a plurality of identifying numbers and values, wherein a plurality of calculated check digits are summed successively in modulo-n arithmetic followed by an Exclusive OR (XOR) logic operation, where the XOR logic operation outputs a sum modulo-n based on inputs, and wherein a remainder modulo-n generates a location-specific code increment/decrement offset; and performing a plurality of digit calculation algorithms against a plurality of locations to determine access to the interior.

15. A method as recited in claim 14, further comprising the step of calculating a plurality of opening codes on a stationary location-specific or mobile location-specific basis; and calculating a plurality of n-digit identifying numbers and values associated with a plurality of locations to pre-set a modulo-n calculation method to derive a result zero (0) modulo-n.

16. A method for accessing an interior of a secure container comprising the steps of:

calculating a plurality of opening codes on a stationary or mobile content-specific basis through physical and/or logical association of a plurality of RFID tags and/or RFID readers in a plurality of locations, wherein each RFID tag and/or reader enables a plurality of identifying numbers and values and a plurality of calculated check digits are summed successively in modulo-n arithmetic followed by an Exclusive OR (XOR) logic operation, where the XOR logic operation outputs a sum modulo-n based on inputs, and wherein a remainder modulo-n generates a location-specific code increment/decrement offset; and performing a plurality of digit calculation algorithms against a plurality of locations to determine access to the interior.

17. A method as recited in claim 16, further comprising the step of calculating a plurality of opening codes on a stationary or mobile content-specific basis; and calculating a plurality of n-digit identifying numbers and values associated with a plurality of locations to pre-set a modulo-n calculation method to derive a result zero (0) modulo-n.

* * * * *